June 9, 1964  F. C. AVILA  3,136,650
METHOD FOR COATING A SURFACE OF AN ARTICLE WITH A RESIN LAYER
Filed Nov. 1, 1961  3 Sheets-Sheet 3

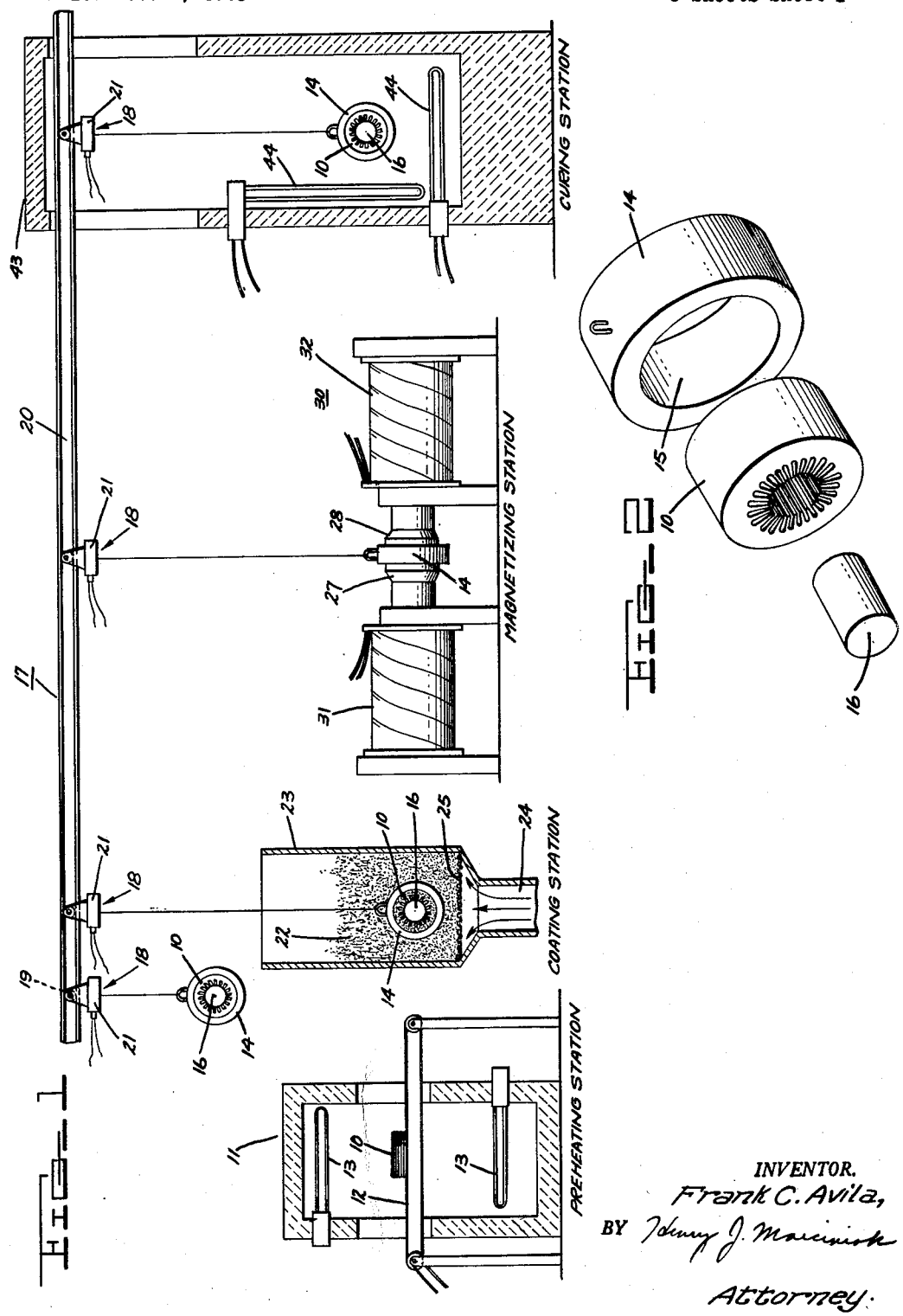

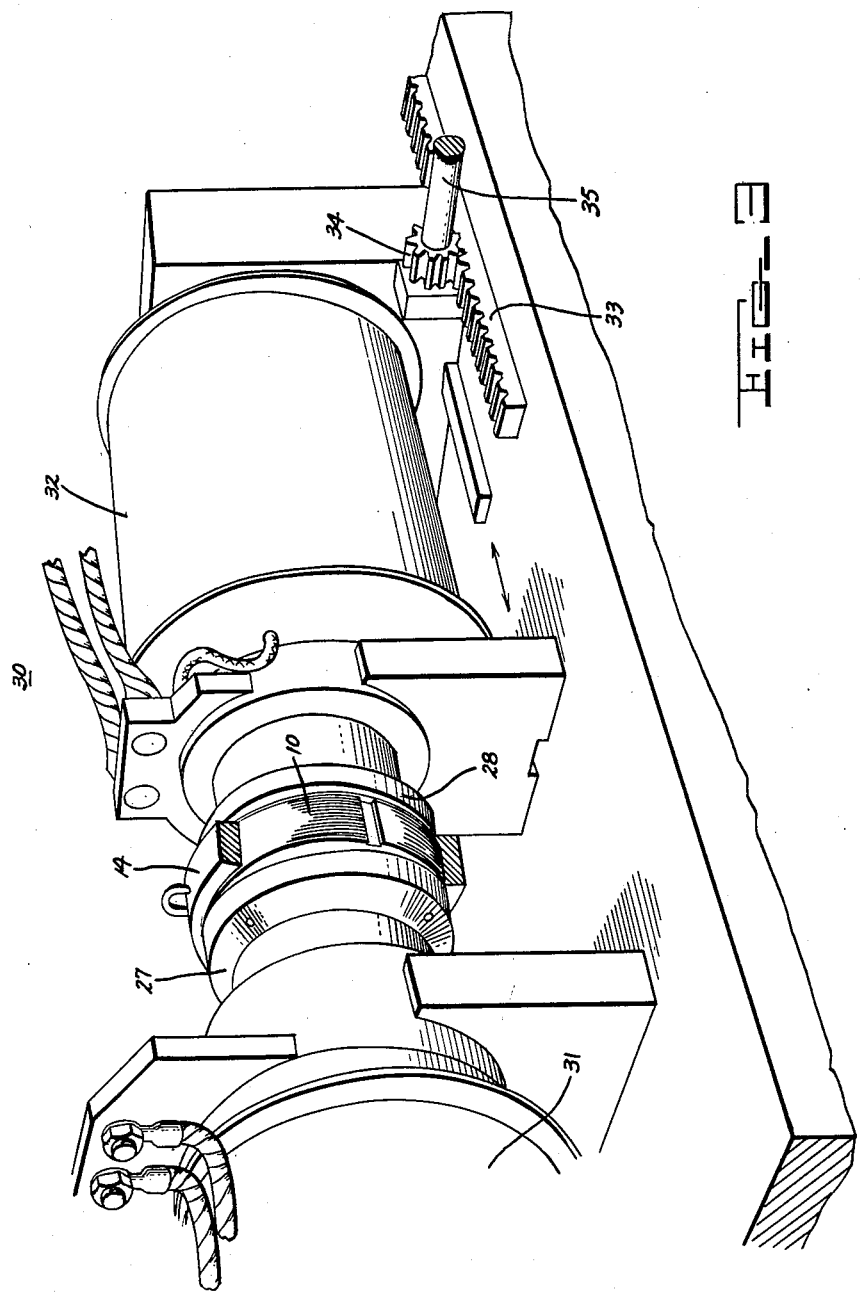

INVENTOR.
Frank C. Avila,
BY Henry J. Marciniak
Attorney.

United States Patent Office

3,136,650
Patented June 9, 1964

3,136,650
METHOD FOR COATING A SURFACE OF AN ARTICLE WITH A RESIN LAYER
Frank C. Avila, Roanoke, Ind., assignor to General Electric Company, a corporation of New York
Filed Nov. 1, 1961, Ser. No. 149,258
9 Claims. (Cl. 117—21)

This invention relates to a method for coating a surface of an article with a layer of resin and more particularly to such an improved method wherein selected portions of the surface are coated with a resin layer of relatively increased thickness.

In the past, difficulty has been experienced in obtaining uniform and continuous coverage of portion of a surface, such as edges and external corners, where fusible powdered resins are employed as a coating material. To form a uniform and continuous film on a surface with such a coating material, it must be rendered sufficiently fluid while in contact with the surface so that it can flow over the surface and form a film. When a resinous coating material is rendered sufficiently fluid to form a continuous film, surface tension forces frequently cause the liquid layer to pull away from edges and corners. In many applications it is desirable that edges and corners be provided with a layer of increased thickness as compared with other portions coated since the corners and edges are susceptible to damage from external impacts and internal stressing.

Where an article to be coated is heated above the melting point of the resin coating material and is dipped into a fluidized bed of powdered resin material, the surfaces of the article that touch the fluidized resin material cause the material to melt and adhere to the surfaces. Drops of molten resin are formed which coalesce and under proper conditions form a continuous liquid coating. The liquid coating is drawn by a wicking action into crevices and is pulled by surface tension forces away from edges and external corners.

Coverage at the corners and edges of an article is generally critical because of the susceptibility of these portions to damage. It is therefore desirable, if not necessary, not only to obtain adequate coverage at the corners and edges and other selected portions but to provide thereon a coating of relatively increased thickness to form a protective layer and minimize the effects of both internal and external stresses.

Accordingly, it is an object of the present invention to provide a method for coating a surface of an article with a layer of resin material fused thereon wherein the thickness of the coating over selected portions of the surface coated can be augmented.

It is a more specific object of the invention to provide a method for applying a layer of resin on the surface of an article by the fluidized bed method wherein the thickness of the coating over selected portions of the surface can be readily increased.

Another object of the invention is to provide a method of applying a layer of fusible powdered resin on the surface of an article and fusing the powdered resin to the surface wherein improved coverage of edges and corners of the surface coated is obtained.

It is still another object of the invention to provide an improved method for applying integral insulation on at least a selected portion of a dynamoelectric machine wherein the layer of integral insulation at the selected portion is formed with a layer of resin having a relatively greater thickness.

These and other objects and advantages of the invention are achieved in a method which includes the step of forming on the surface to be coated a liquid layer of resin intermixed with particles of magnetic material, subjecting of the liquid layer to a magnetic field so that at least some of the particles of magnetic material are attracted by the magnetic field and thereby cause the thickness of the layer on a selected portion of the surface to increase and then curing the resin layer. According to the method of the invention the thickness of the coating may be increased at selected portions of the surface to be coated, such as corners and edges, which are ordinarily more susceptible to damage.

In a more specific aspect in another form of my invention the method is utilized in conjunction with a fluidized bed process of applying fusible resin powders on an article. Finely divided particles of magnetic material, such as iron oxide, are thoroughly mixed with molten resin. The molten resin is cooled and when it has solidified, the resin is pulverized. The finely divided particles of magnetic material and resin coating material are fluidized. The article to be coated is placed in the fluid bed. After the article is removed from the fluidized bed, it is placed in a magnetic field so that at least some of the magnetic particles in the coating are attracted to selected portions, such as corners, so that the thickness of the resin layer over the selected portions of the surface is increased as may be desired in a particular application. After the magnetizing step has been completed, the resin coating is then cured to a solid infusible state.

Further aspects of the invention will be apparent from the more detailed description of the invention. It will be understood that the specification concludes with claims which particularly point out and distinctly claim the subject matter which I regard as my invention. The invention itself, however, together with further objects and advantages thereof may be best understood by reference to the following description taken in connection with the accompanying drawings in which:

FIGURE 1 is a side view, partly in cross section, of an assembly line showing schematically an exemplification of the improved method of the invention;

FIGURE 2 is an enlarged exploded view of the stator and article supporting means used in the exemplification of the invention illustrated in FIGURE 1;

FIGURE 3 is an enlarged perspective view of the magnetizing apparatus used in the exemplification of the invention illustrated in FIGURE 1;

Figure 4:
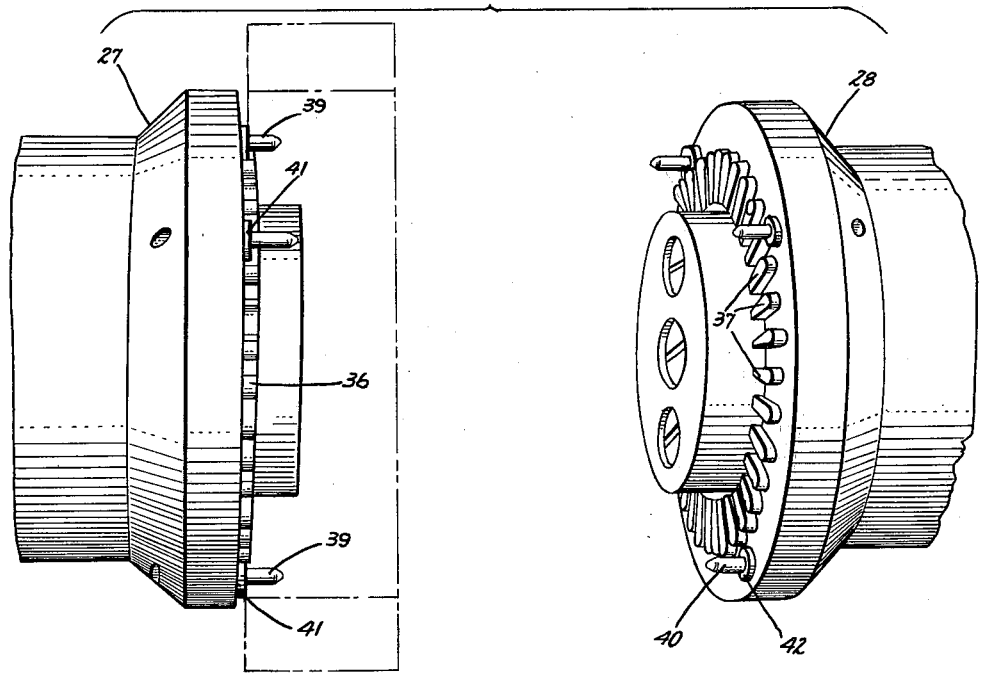
FIGURE 4 is an enlarged fragmentary view of the magnetizing heads of the magnetizing apparatus shown in FIGURE 3 and illustrating an improved configuration adapted for use in connection with the stators of dynamoelectric machines.

Referring now to the drawings in more detail, FIGURES 1 through 5 show the invention as it may be applied to a stator 10 of a dynamoelectric machine such as a motor (not shown). In the assembly line schematically illustrated in FIGURE 1, the stator 10 is carried through a preheating oven 11 on a conveyor belt 12. Where the improved method of the invention is utilized in connection with a fluidized bed, as is done in the illustrated exemplification of the invention, the stator 10 is preheated to a temperature above the melting point of the particular resin coating material which is used in the fluidized bed. The resin coating will provide integral insulation for the outer faces of the stator 10. As the term is used in connection with fluidized beds, the melting point denotes the temperature at which the powdered coating material is sufficiently "tacky" to adhere to the exposed heated surfaces of the stator 10 and sufficiently fluid to coalesce and form a continuous coating.

The preheating step is accomplished by introducing a controlled amount of heat into the oven 11 by heating elements 13 shown near the top and bottom of the oven 11. After the stator 10 has been heated in the oven for sufficient period of time to cause the stator 10 to reach a temperature above the melting point of the coating material but below the decomposition temperature of the coating material, the stator 10 is then removed from the oven 11 and transported to the fluidizing station.

It will be appreciated that the preheating temperature and time of heating will depend to some extent upon the shape and size of the article to be coated. If the article has a small heat storage capacity sufficient heat must be stored in the article so that it will cause the fusible powdered coating to adhere to the surface and form a coating thereon. It will be apparent that if the article has a relatively large heat storage capacity, it may not be necessary to heat the article to a temperature very much above the melting temperature of the coating material.

Although in the illustrated embodiment of the invention the preheating step is required since the coating material is applied in a fluidized bed process, it will be apparent that the method in accordance with the invention can be utilized in conjunction with other methods of applying fusible powdered resins wherein the resin is melted on the surface of an article to form a continuous liquid layer thereon. It will be understood that some methods of applying fusible resin powders may not require a preheating step. For example, the layer of resin may be formed by immersing the article in a molten resin bath. Also, a method that does not require a preheating step is one in which the surface on the article to be coated is first wetted with a suitable wetting agent so that the fusible resin powders adhere thereto before the article is heated. The coated surface is then heated to a temperature above the melting point of the coating material but below the decomposition temperature in order to obtain a smooth and continuous coating over the surface. It will be appreciated that where the liquid layer of resin and magnetic material is formed by dipping the article or by the use of wetting agents, it is not necessary to preheat the article.

Referring again to FIGURE 1, after the stator 10 has been heated in the oven 11 to a temperature above the melting point of the resin coating material but below its decomposition point, it is placed in a masking member 14. The masking member 14 serves as a carrying support for the stator 10 and also serves as a mask for the outer periphery of the stator 10. As is best seen in the exploded view shown in FIGURE 2, the masking member 14 is assembled on outer circumference of the stator 10. Since it is not desired to coat the stator bore 15, a masking plug 16 is placed within the stator bore 15. This masking arrangement does not constitute a part of this invention and is more fully described and claimed in application Serial Number 658,111, filed on May 9, 1957, in the name of Gilbert M. Knaus.

The preheated stator 10 is transported by a conveyor system 17 to the coating station. The conveyor system 17 includes a support member 18 adapted to move on rollers 19 rotatably engaged in a track 20. The support member may include any suitable means, such as a motor and winch assembly 21, for lowering and raising the stator 10 or other object to be coated.

At the coating station the step of forming a layer of liquid coating material on the surface to be coated is carried out. The stator 10 is lowered in a tank 23 containing a fluidized bed 22 of powdered coating material and finely divided magnetic material. The magnetic material used in the exemplification of the invention was black iron oxide powder. The resin used was an epoxy resin.

Preferably, the iron oxide powder should be completely dispersed in the resin. To bring about a good dispersion of the magnetic material in the resin, the magnetic material may be added to resin which has been heated to a liquid state. After thoroughly mixing the mixture, it may be cooled, and the solidified mixture of magnetic material and resin may then be pulverized in a hammer mill or other suitable means. The powdered mixture may then be fluidized.

For most purposes it is advantageous to employ relatively high percentages of the magnetic material, preferably more than one percent by weight of the resin. In the exemplification of the invention it was found that from one percent to ten percent by weight of the resin provided satisfactory results. However, as the amount of magnetic material is decreased, it becomes necessary to employ a magnetic field of increased intensity to attract the particles toward the selected portion of the surface to be coated. A mixture of magnetic material and powdered resin passing through a 60 mesh sieve provided satisfactory results when fluidized.

Referring again to the coating station as shown in FIGURE 1, it will be seen that the stator 10 is immersed in the fluidized bed 22 of resin and magnetic material formed in a tank 23. The tank 23 is provided with a gas inlet opening 24 connected to a suitable source of gas under pressure (not shown). The bottom of the tank 23 has a perforated screen base 25 through which a supply of gas such as air is forced under pressure in the direction indicated by the arrows shown therein. The upwardly moving gas causes the finely divided particles of the coating material comprised of the resin and magnetic material to be suspended in the tank 23 and to form the fluidized bed 22 which has liquid-like characteristics.

The period of immersion of the stator 10 will depend upon a number of factors including the type of coating material used, the thickness of the coating desired, the preheating temperature and the heat storage capacity of the stator 10. It will be observed from FIGURE 1, that only the unmasked surfaces of the stator 10 are coated with the fluidized coating material during immersion. The masking member 14 and masking plug 16 prevents the fluidized coating material from adhering to the bore and outer periphery of the stator 10. In some applications it may be desirable to cover the entire article with the coating material. Thus, in such applications the masking member 14 and plug 16 may be eliminated.

When a continuous layer of the coating material is formed in the stator 10, it is withdrawn from the fluidized bed 22 and conveyed to the magnetizing station where the step of magnetizing is carried out. The masking plug is removed from the bore of the stator 10. As is shown in FIGURES 1, 3 and 4 the stator 10 is placed between a pair of pole members 27, 28 of a magnetizing apparatus generally identified by reference numeral 30. The magnetizing apparatus 30 includes a pair of coils 31, 32 which are energized from a suitable power source (not shown).

As is best seen in the perspective view of the magnetizing apparatus 30 illustrated in FIGURE 3, coil 32 and pole member 28 are moved by a rack 33 and pinion 34 driven by a shaft 35. As is shown in FIGURE 4, pole members 27, 28 are provided with a plurality of pole projections 36, 37 which are shaped substantially to conform to the configuration of the stator slots and are positioned therein during the magnetizing operation. In order that the pole projections 36, 37 and pole members 27, 28 do not touch the liquid coating on the stator 10, dowel members 39, 40 are provided on pole members 27, 28. The dowel members 39, 40 engage a plurality of positioning holes in the stator 10 when the pole members 27, 28 are brought in assembled relation therewith. The dowel members 39, 40 support the stator 10 and masking member 14 and also maintain the stator 10 in spaced relationship from the pole members 27, 28. The height of shoulders 41, 42 formed at the base of the dowel members 39, 40 determines the axial clearance between the stator 10 and the pole members 27, 28.

Figure 5:
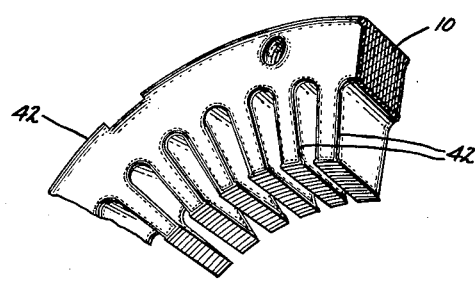
FIGURE 5 is a fragmentary view of perspective of stator coated in accordance with the method illustrated in FIGURE 1.

In order to carry out the magnetizing step of the invention the stator 10 is first positioned with respect to dowel members 39 of the pole member 27. The pinion shaft 35 is rotated to bring the other pole member 28 in position with respect to the stator 10 as is shown in FIGURE 3. When the coils 31, 32 are energized, the resultant magnetic field causes the magnetic particles dispersed in the liquid resin layers on the stator 10 to be attracted toward the outer edges and corners thereof. As finely divided magnetic particles dispersed in the liquid resin layers are drawn to the edges and corners, liquid resin is also drawn with the magnetic particles to the edges and corners to augment the thickness of the resin layer. As is shown in FIGURE 5, built-up rounded portions 42 of coating material are formed at and adjacent to the edge and corners of stator 10 which have a relatively greater thickness than the rest of the coating layer. The thickness of the built-up portions 42 may be controlled by the intensity of the applied magnetic field.

According to the improved method of the invention, it is possible to obtain a resin coating of increased thickness at selected portions of the surface coated. It will be appreciated that when fusible resin powders are applied to a surface by heating powders above their melting point, as the fusible powder melts and coalesces, surface tension causes the liquid coating to pull away from edges and corners. As a result, a coating is formed which is relatively thinner in the vicinity of edges and corners. Consequently, it has ordinarily been a practice in the past to apply a thicker coating to compensate for the thinner coating along edges and corners. As a result, more resin material had to be employed than would normally be required but for the corner coverage.

The method of the present invention permits control of this thickness of the coating material on portions of the surface coated where it is most needed with an economical utilization of material. It will be appreciated that the edges and corners of a stator are most susceptible to damage during the assembly operation and the life of the apparatus. By forming a layer of coating material of increased thickness along the edges of the winding slots, the possibility of such damage to the insulation coating is minimized since protection is provided where it is most needed.

The amount of time required to effect a build up of the coating material was determined by observing the coating at the magnetizing station and after the coating was cured. Prolonged exposure of the coating material to the magnetic field does not appreciably increase the thickness of the coating. When the stator 10 was subjected to the magnetic field, it was found that the build up of the coating material at the corners and edges took place almost instantaneously.

Referring again to FIGURE 1, after the coating material adjacent to the edges and corners of the stator 10 has been sufficiently built up, pole member 28 is moved outwardly from the stator 10. The stator 10 is disengaged from the dowel members 39 of the other pole member 27. The masking member 14 is placed on the support member 18 and the assembly is conveyed to the curing station where the post heating or curing step is carried out in an oven 43.

It was found that once the coating material was magnetized to effect a build-up at selected locations, removing the stator 10 from the influence of the magnetic field did not result in any appreciable flow of material away from the edges. It is believed that after the finely divided particles are magnetized the magnetizing force between the magnetic particles is sufficient to overcome the surface tension forces which tend to oppose any build up of the coating material. Thus, the magnetizing step can be carried out independently of the curing step. However, it will be apparent that if it is desirable to do so in some applications of the invention, the curing step and the magnetizing step may be carried out simultaneously.

In the illustrative embodiment of the invention the curing oven 43 was substantially similar to the preheating oven 11. The curing temperature in the curing oven 43 was maintained at a predetermined level by means of the heating elements 44. The curing temperature employed will depend upon the particular resin-system employed and time interval selected. If the resin used can be cured to a solid infusible state at room temperatures, the curing step may be carried out without need for the curing oven 43.

The preheating and curing ovens 11, 43 may be of any suitable type such as a hot air oven deriving heat energy from electric heating coils or from the combustion of a fuel such as gas or fuel oil or other conventional means. Induction heating or radiant heating may also be advantageously employed for this purpose.

In the method illustrated in FIGURE 1, the stator 10 used was a thirty frame stator of a four pole ¼ horsepower motor. The preheating step was carried out at a temperature of 190° centigrade for an interval of 60 minutes. A resin composition was prepared containing 100 parts of an epoxy resin having a weight per epoxide ranging from 875 to 1025, 4 parts of melamine, 10 parts of titanium oxide, 3 silica aerogel and 3 parts of black iron oxide. The mixture was pulverized, and the powdered mixture that passed through a 60 mesh sieve was fluidized.

The preheated stator 10 was immersed in the fluidized bed for approximately 4 seconds. It was then removed and placed in a magnetic field having a strength of approximately 160,000 ampere turns per inch for 5 seconds. After the coating was magnetized, it was cured at a temperature of 180° centigrade for an interval of 60 minutes.

It will be appreciated that the method of the invention is readily adaptable to various resin coating materials and methods of application. In order to demonstrate the utility of the invention I have described in the foregoing paragraphs, a specific exemplification thereof as it may be utilized to apply integral insulation to a stator.

Figure 6:
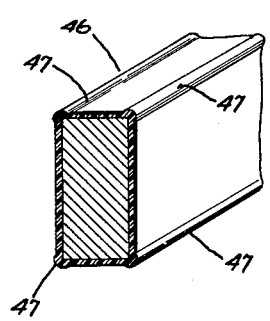
FIGURE 6 is a sectionalized view in perspective of an article having a rectangular cross section coated in accordance with the invention.

Although the method of the present invention is illustrated in connection with a stator of a dynamoelectric machine, it will be apparent that the advantages of the present invention can be realized in articles having less complex configuration. In FIGURE 6 I have illustrated a rectangular shaped article 46 which has been coated in accordance with the method of the invention to provide increased corner coverage. It will be seen from the cross section that a rounded corner portion 47 of increased thickness is formed along the four corners of the rectangular member, thereby providing a protective layer that will minimize damage to the resin coating at the corners and edges where cracking is most likely to occur. It will be seen that the method of the present invention is of general applicability and may be employed where it is desired to increase the thickness of selected portions of a surface coated with a resin layer formed by melting and coalescing fusible resin powders. Thus, the improved method of the present invention can be utilized wherever fusible resin powders are employed as a coating material for application to components and mechanical elements that are used by the chemical, textile, electrical and building industries.

It will be apparent that the method of the present invention is adapted for the application of coatings of many different resin materials. Among the resin materials that may be used are the thermoplastic type, such as the polyvinyl acetal resins, cellulose ethers, cellulose esters, superpolyamide resins, polyethylene, polyvinyl acetal resins modified with heat-hardenable resins, superpolyamide resins modified with heat-hardenable resins, phenol-aldehyde resins modified with unsaturated alkyd resins and phenol-aldehyde condensation products modified with various oils. The epoxy resins used in the exemplification were a polyether derivative of phenol obtained by reacting an epihalogenohydrin, such as epichlorohydrin, and a phenol such as bis-(4-hydroxyphenyl)-dimethylmethane. These resins are more fully described in U.S. Patent No. 2,324,483, Castan; U.S. Patent No. 2,444,333, Castan, and British Patents 518,057 and 579,698.

From the foregoing description of the method of the present invention, it will be apparent that the method is readily adaptable to mass production techniques. It will be appreciated that conveyorization of the article to be coated can be carried out in a number of different ways other than the one which has been diagrammatically illustrated to exemplify the invention. Although black iron oxide was used as the magnetic material in the exemplification of the invention, it will be apparent that other magnetic materials, such as magnetic ferrites, powdered iron, or powdered magnetic alloys may be used in the practice of the invention. The advantages of the present invention may be achieved with resins generally which undergo a thermoplastic phase and which will fuse to the surface to be coated.

While the present invention has been described by reference to a particular exemplification thereof, it is to be understood that many modifications may be made by those skilled in the art without actually departing from the invention. It is, therefore, intended by the appended claims to cover all such modifications that fall within the true spirit and scope of the invention.

What I claim as new and desire to secure by Letters Patent of the United States is:

1. A method of forming a coating of resin on a surface of an article with at least a selected portion thereof being covered with a coating of relatively greater thickness, said method comprising the steps of:
   (a) forming on the surface an uncured layer of resin intermixed with particles of magnetic material;
   (b) subjecting said layer to a magnetic field so that at least some of said particles of magnetic material are attracted by said magnetic field to cause the thickness of at least a selected portion of the layer of resin to thereby increase; and
   (c) curing said layer of resin.

2. A method of coating a surface of an article with a fused layer of resin comprising the steps of:
   (a) forming on the surface a liquid layer of resin containing finely divided particles of magnetic material dispersed therein;
   (b) magnetizing the finely divided particles in said layer so that the thickness of the layer of resin over a selected portion of the surface is relatively greater; and
   (c) curing said layer of resin to a solid infusible state.

3. A method for coating a surface of an article with a layer of thermoplastic resin having selected portions of relatively greater thickness, said method comprising the steps of:
   (a) heating the article to a predetermined temperature above the melting point of the resin;
   (b) fluidizing a quantity of pulverant coating material to form a fluidized bed comprised of the resin intermixed with particles of magnetic material;
   (c) immersing the article to be coated in said fluidized bed for a predetermined period of time to form a layer of liquid resin thereon;
   (d) removing said article from said fluidized bed;
   (e) placing the article in a magnetic field so that at least some of said magnetic particles are attracted by the magnetic field to cause the thickness of at least a selected portion of said resin layer to become relatively greater than the thickness of other portions thereof; and
   (f) curing said resin layer.

4. A method forming a coating of resin on a surface of an articles comprising the steps of:
   (a) heating the article to a predetermined temperature above the melting point of the resin so that the resin contacting the article will melt and fuse thereon;
   (b) immersing the article in a fluidized bed of the resin containing particles of magnetic material dispersed therein until a layer of liquid resin and magnetic material is formed on the surface to be coated;
   (c) withdrawing the article from the fluidized bed;
   (d) magnetizing the finely divided magnetic particles so that the thickness of the layer of resin over a selected portion of the surface is relatively greater; and
   (e) curing said layer of resin.

5. A method of coating a surface of an article with a resin, the corners and edges of the surface being covered with a coating of relatively greater thickness, said method comprising the steps of:
   (a) forming on the surface a liquid layer of resin containing finely divided particles of magnetic material dispersed therein;
   (b) magnetizing the finely divided magnetic particles in said layer so that the thickness of the layer of resin at the corners and edges of the surface is augmented; and
   (c) curing said layer of resin to a solid infusible state.

6. A method of forming a coating of fused resin on a surface of an article with at least the corners and edges of the surface being covered with a layer of relatively greater thickness, said method comprising the steps of:
   (a) forming on the surface a liquid layer of resin containing particles of magnetic material;
   (b) subjecting said liquid layer to a magnetic field of sufficient intensity to cause particles of the magnetic material to be attracted towards the corners and edges and thereby cause the layer formed at said corners and edges to build up; and
   (c) curing said layer of resin.

7. A method of coating a surface of an article with a layer of thermoplastic resin, the layer at the corners and edges thereof being of relatively greater thickness, said method comprising the steps of:
   (a) heating the article to a predetermined temperature above the melting point of the resin;
   (b) fluidizing a quantity of the thermoplastic resin and finely divided particles of magnetic material to form a fluidized bed;
   (c) immersing the article to be coated in said fluidized bed to form on the surface a continuous layer of liquid resin containing the particles of magnetic material;
   (d) terminating immersion of the article in the fluidized bed;
   (e) magnetizing the finely divided magnetic particles so that the thickness of the layer of liquid resin is augmented at corners and edges of the surface; and
   (f) curing said layer of resin to form a solid layer of fused resin having a relatively greater thickness at corners and edges of the surface.

8. A method of applying integral insulation on a surface of a dynamoelectric machine with at least a selected portion thereof being covered with a coating of relatively greater thickness, said method comprising the steps of:
   (a) forming on the surface a liquid layer of resin containing particles of magnetic material dispersed therein;
   (b) magnetizing the magnetic particles in said layer so that the thickness of the layer of resin is augmented at the selected portion thereof; and
   (c) curing said layer of resin to form a solid layer of fused resin having a relatively greater thickness at said selected portion.

9. A method of applying integral insulation on a surface of a dynamoelectric machine, selected corners and edges thereof being coated with a layer of integral insulation of relatively greater thickness, said method comprising the steps of:
(a) forming on the surface a liquid layer of insulating resin containing finely divided particles of magnetic material;
(b) subjecting the liquid layer to a magnetic field of sufficient intensity to cause particles of magnetic material to be attracted towards the selected corners and edges of the surface and thereby cause the layer of resin formed at said corners and edges to build up; and
(c) curing said layer of resin to form a solid layer of fused resin having a relatively greater thickness at said selected corners and edges.

References Cited in the file of this patent

UNITED STATES PATENTS

| | | |
|---|---|---|
| 2,152,077 | Meston et al. | Mar. 28, 1939 |
| 2,937,408 | Limpel | May 24, 1960 |
| 2,974,059 | Gemmer | Mar. 7, 1961 |
| 2,978,371 | Bacin | Apr. 4, 1961 |
| 3,044,892 | Gray | July 17, 1962 |

FOREIGN PATENTS

| | | |
|---|---|---|
| 1,023,999 | Germany | Feb. 6, 1958 |